(12) United States Patent
Bashkansky et al.

(10) Patent No.: US 8,370,823 B2
(45) Date of Patent: Feb. 5, 2013

(54) DEVICE, SYSTEM, AND METHOD OF COMPUTER PROGRAM OPTIMIZATION

(75) Inventors: Guy Bashkansky, Haifa (IL); Gad Haber, Nesher (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/845,121

(22) Filed: Aug. 27, 2007

(65) Prior Publication Data
US 2009/0064117 A1   Mar. 5, 2009

(51) Int. Cl.
*G06F 9/44* (2006.01)
*G06F 9/45* (2006.01)

(52) U.S. Cl. ......... 717/154; 717/131; 717/141; 717/159

(58) Field of Classification Search .................. None
See application file for complete search history.

(56) References Cited

U.S. PATENT DOCUMENTS

| | | | |
|---|---|---|---|
| 5,740,447 A * | 4/1998 | Kurahashi | 717/159 |
| 6,059,839 A * | 5/2000 | Dehnert et al. | 717/154 |
| 7,000,227 B1 * | 2/2006 | Henry | 717/152 |
| 7,086,046 B2 * | 8/2006 | Barsness et al. | 717/152 |
| 7,281,017 B2 * | 10/2007 | Hostetter et al. | 1/1 |
| 7,542,980 B2 * | 6/2009 | Tsyganskiy et al. | 1/1 |
| 7,543,282 B2 * | 6/2009 | Chou | 717/151 |
| 7,979,852 B2 * | 7/2011 | Bodin et al. | 717/154 |
| 2002/0073407 A1 * | 6/2002 | Takayama et al. | 717/154 |
| 2003/0005424 A1 * | 1/2003 | Ansari et al. | 717/154 |
| 2003/0023961 A1 * | 1/2003 | Barsness et al. | 717/152 |
| 2003/0028864 A1 * | 2/2003 | Bowen | 717/141 |
| 2004/0010782 A1 * | 1/2004 | Moritz | 717/151 |
| 2004/0111708 A1 * | 6/2004 | Calder et al. | 717/131 |
| 2006/0242207 A1 * | 10/2006 | Tsyganskiy et al. | 707/203 |
| 2007/0226722 A1 * | 9/2007 | Chou | 717/158 |

OTHER PUBLICATIONS aisee, aiSee: Post Pass Code Optmizaton, Dec. 2002, 2 pages, <http://www.aisee.com/graph_of_the_month/aipop.htm>.*
aisee, Optimized and UnOptimized Assembly code differences, Dec. 2002, 3 pages, <http://www.aisee.com/graph_of_the_month/aipop.gif>.*
Thomas Ball, software Visualization in the Large, 1996 IEEE, pp. 33-43, <http://ieeexplore.ieee.org/stamp/stamp.jsp?tp=&arnumber=488299>.*
A. Figureau, Optimization and the Genetic Code, 1989 Kluwer Academic Publishers, pp. 57-67, <http://www.springerlink.com/content/x43j3n4614044672/>.*
Gennaro Costagliola, Constructing Meta-CASE Workbenches by Exploiting Visual Language Generators, 2006 IEEE, pp. 156-175, <http://ieeexplore.ieee.org/stamp/stamp.jsp?tp=&arnumber=1610608>.*
Kenneth Rose, Deterministic Annealing for Clustering, Compression, Classification, Regression, and Related Optimization Problems, 1998 IEEE, pp. 2210-2239, <http://ieeexplore.ieee.org/stamp/stamp.jsp?tp=&arnumber=726788>.*
Nurit Dor, Software Validation via Scalable Path-Sensitive Value Flow Analysis, 2004 ACM, pp. 12-22, <http://dl.acm.org/citation.cfm?id=1007512.1007515>.*
Toshio Suganuma, Design and Evaluation of Dynamic Optimizations for a Java Just-In-Time Compiler, Jul. 2005 ACM, pp. 732-785, <http://dl.acm.org/citation.cfm?id=1075382.1075386>.*

(Continued)

*Primary Examiner* — Thuy Dao
*Assistant Examiner* — Cuong V Luu (57) ABSTRACT

Device, system, and method of computer program optimization. For example, an apparatus to analyze a plurality of versions of computer program includes: a code analyzer to determine one or more code differences between first and second versions of the computer program, based on at least one optimization log associated with at least one of the first and second versions of the computer program.

18 Claims, 3 Drawing Sheets

OTHER PUBLICATIONS

Clara Jaramillo et al., "Debugging and Testing Optimizers through Comparison Checking", Electronic Notes in Theoretical Computer Science, v 65, n 2, Apr. 2002, COCV'02 Compiler Optimization Meets Compiler Verification (Satellite Event of ETAPS 2002), p. 89-105.

Product: aiPop—Automatic code compaction, Company: AbsInt, Saarbruecken, Germany Publication: Online documentation : http://www.aisee.com/graph_of_the_month/aipop.htm and http://www.absint.com/aipop/, 2002.

Sid-Ahmed Touati et al., "On the decidability of phase ordering problem in optimizing compilation", Proceedings of the 3rd Conference on Computing Frontiers 2006, CF '06, v 2006, Proceedings of the 3rd Conference on Computing Frontiers 2006, CF '06, 2006, p. 147-156.

* cited by examiner

DEVICE, SYSTEM, AND METHOD OF COMPUTER PROGRAM OPTIMIZATION

FIELD

Some embodiments of the invention are related to the field of computer programming, and more particularly to optimization of computer programs.

BACKGROUND

Debugging, optimizing and fine-tuning the performance of a computer program may require efforts and significant time from a programmer. The programmer may utilize a performance analyzer tool which presents a visual representation of some performance bottlenecks. Accordingly, the programmer may then manually modify the program's source code, or may apply additional optimization methods, in an attempt to optimize the program performance. Unfortunately, this process may be repeated for a significant number of iterations, or may require application of optimization methods in various combinations and sequences, in order to achieve a satisfyingly optimized program.

SUMMARY

Some embodiments of the invention include, for example, devices, systems, and methods of computer program optimization.

Some embodiments include, for example, an apparatus to analyze a plurality of versions of a computer program. The apparatus includes, for example, a code analyzer to determine one or more code differences between first and second versions of the computer program, based on at least one optimization log associated with at least one of the first and second versions of the computer program.

In some embodiments, a method for analyzing a plurality of versions of a computer program includes: determining one or more code differences between first and second versions of the computer program, based on at least one optimization log associated with at least one of the first and second versions of the computer program.

In some embodiments, a system to analyze a plurality of versions of a computer program includes: a compiler to generate first and second versions of the computer program; and a code analyzer to determine one or more code differences between the first and second versions of the computer program, based on at least one optimization log associated with at least one of the first and second versions of the computer program.

Some embodiments include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The terms "program" or "code" or "program version" as used herein include, for example, a source code, a computer program, a code or program written in a high-level programming language, a code or program written in a very high-level programming language, a code or program written in a low-level programming language, an assembly code or program, a machine language code or program, a portion of a code or program, a segment of a code or program, one or more instructions or sets of instructions, one or more subroutines, one or more procedures, one or more functions, one or more libraries, a logic, an object-oriented code or program, a portable or non-portable code or program, a code or program that requires compilation by a compiler, an originally-written code or program, a non-optimized code or program, an optimized code or program, a non-modified program, a modified program, a debugged program, a non-debugged program, a pre-compilation program version, a post-compilation program version, a pre-optimization program version, a post-optimization program version, a pre-linking program version, a post-linking program version, a program that was modified manually by a programmer, a program that was modified automatically by a compiler and/or linker and/or debugger and/or optimizer, a program that was subject to one or more iterations of optimization, a program that was subject to one or more methods of optimization, or the like.

The terms "optimization" or "program optimization" as used herein include, for example, a process or method of modifying a program in order to improve at least one aspect or property of the program, e.g., to consume fewer processing resources, to consume fewer memory resources, to consume fewer resources of other types, to be executed more rapidly, to be capable of executing with reduced system requirements or reduced power consumption, to reduce the size (e.g., in kilobytes) that the program occupies, to reduce the number of files or extensions that the program includes or requires, to make the program operate more efficiently, to make the program run faster, to remove or resolve or eliminate performance bottlenecks, a manual optimization, an automatic optimization, an optimization iteration, an optimization by a compiler and/or profiler and/or linker and/or optimizer, and optimization by an optimization module included (e.g., as an option) in another application (e.g., a compiler), an optimization by a stand-alone optimizer tool or optimizer application, or the like.

The terms "code modification" or "program modification" or "instruction modification" as used herein includes, for example, deletion or removal of one or more instructions; addition or insertion of one or more instructions; shifting or moving or relocation of one or more instructions; splitting of one or more instructions into another number of instructions; combining two or more instructions into one or more instruction(s); replacement of one or more instructions with one or more other instructions; and/or other transformations or modifications performed manually and/or automatically during code optimization by an optimizer, a compiler, a programmer, or the like.

At an overview, some embodiments of the invention include a code analysis and optimization tool that allows semantic and/or visual comparison between multiple versions of computer programs or codes. The code analysis and optimization tool presents to a programmer the differences, for example, among an original or non-optimized program version, a first optimized program version resulting from a first optimization method, a second optimized program version resulting from a second optimization method or from a second iteration of the first optimization method, or the like.

In some embodiments, the code analysis and optimization tool allows the programmer to apply optimization options or optimization methods in various orders or sequences, and to compare between the resulting program versions. This may allow the programmer to actively fine-tune the program in a rigorous or staged manner. For example, the programmer uses the code analysis and optimization tool to consecutively apply on the program various optimization methods (or sets of optimization methods), and to examine the resulting program version after each optimization, with comparison to other program version(s). This is repeated until the programmer determines that performance "bottlenecks" are adequately resolved or that a satisfactory program version is achieved.

In some embodiments, the code analysis and optimization tool provides semantic or visual comparison between two or more program versions. For example, a side-by-side comparison, a color-coded comparison, a comparison presentation scheme that highlights or colors changes between program versions, or other types of semantic or visual comparisons may be generated and presented to the programmer.

In some embodiments, the code analysis and optimization tool allows the programmer to directly apply various optimization methods on a displayed program version, and to compare among multiple versions of the generated optimized programs.

In some embodiments, code analysis and optimization tool further produces as output an ordered list of substantially all the optimizations that were applied on the program until the programmer determined that satisfactory program version is achieved; as well as a list of substantially all the modification made to the program. The code analysis and optimization tool thus provides a visualization of a process of debugging performance issues.

Figure 1:
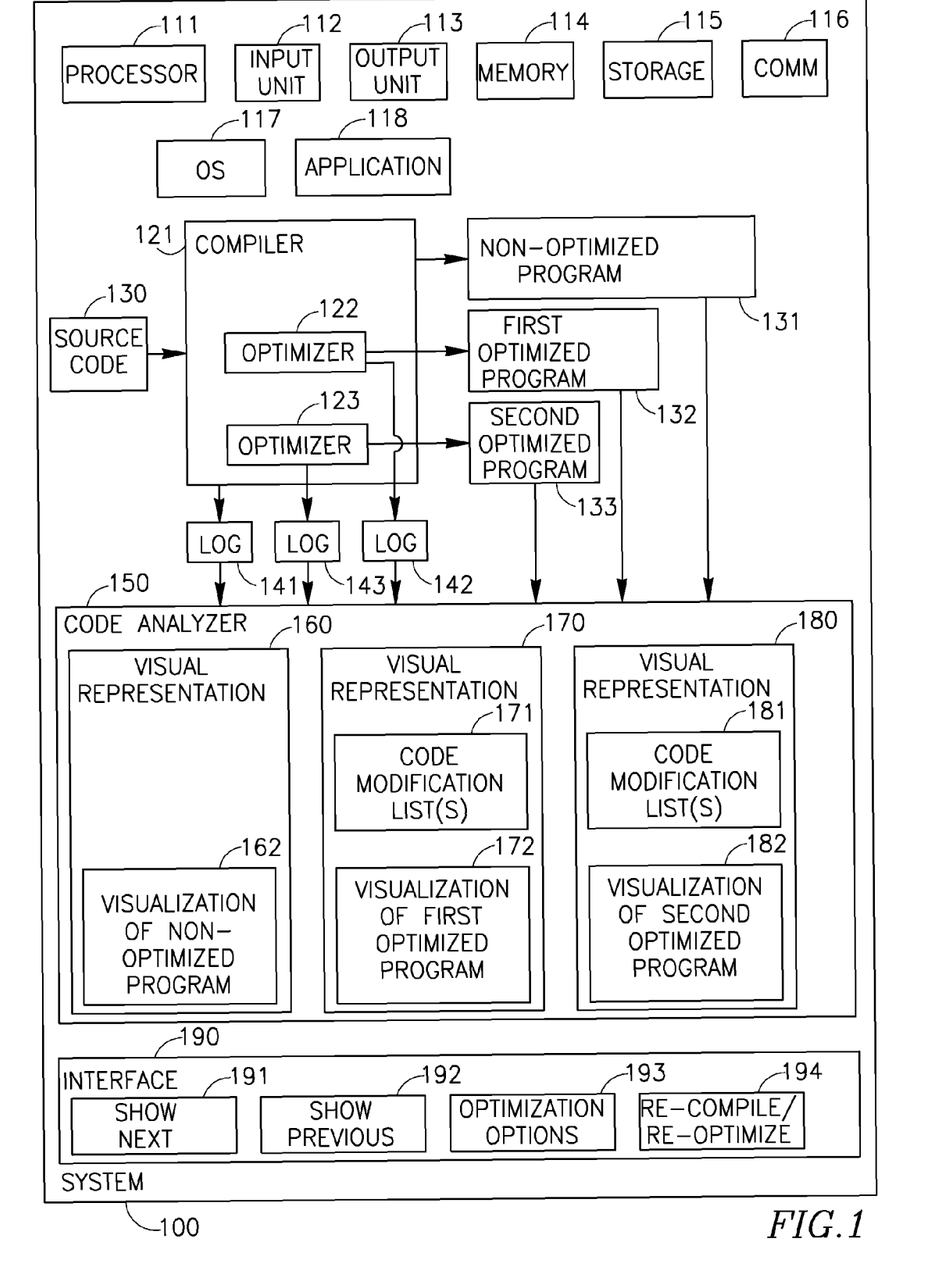
FIG. 1 is a schematic block diagram illustration of a system for computer program optimization in accordance with a demonstrative embodiment of the invention.

FIG. 1 schematically illustrates a block diagram of a system 100 for computer program optimization in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, and a communication unit 116. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 117 of system 100 or of one or more software applications 118.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by system 100.

Communication unit 116 includes, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 includes, or is associated with, one or more antennas, for example, a dipole antenna, a monopole antenna, an omni-directional antenna, an end fed antenna, a circularly polarized antenna, a micro-strip antenna, a diversity antenna, or the like.

In some embodiments, the components of system 100 may be enclosed in a common housing, packaging, or the like, and may be interconnected or operably associated using one or more wired or wireless links. In other embodiments, components of system 100 may be distributed among multiple or separate devices or locations, may be implemented using a client/server configuration, may communicate using remote access methods, or the like.

System 100 includes a code or program to which the analysis tools are applied in accordance with some embodiments of the invention. For example, a source code 130 resides in system 100, e.g., an originally written or composed by a programmer using system 100, as downloaded or copied from a third party, or as otherwise obtained or created. The source code 130 may be, for example, written in a high-level programming language.

System 100 further includes a compiler 121 able to compile the source code 130 and to produce an assembly language code, a compiled code, a machine code, or an executable program. Compiler 121 includes, or is associated with, one or more optimizers or optimization modules, for example, an optimizer 122 and an optimizer 123. One or more of the optimizers 122-123 may be invoked, for example, prior to compilation, during compilation, or after the compilation. Optionally, one or more of the optimizers 122-123 may be invoked by the programmer by executing the compiler 121 using particular commands or extensions or options.

For example, the programmer may command the compiler 121 to compile the source code 130 substantially without optimizations (e.g., a "plain" compilation without utilizing optimizer 122 and/or optimizer 123); and compiler 121 may thus generate a non-optimized program 131. The non-optimized program 131 may be utilized as a base reference for determination, analysis, comparison and/or visual presentation of code modifications, as described herein.

The programmer may command the compiler 121 to compile the source code 130 in a compilation process that does not include optimization. Compiler 121 may thus generate a non-optimized program 131. Optionally, compiler 121 (or optimizers 122 and/or 123) may generate a "null" optimization log 141, indicating that no optimization operations were performed during the compilation, and/or indicating that no code modification operations were performed during the compilation.

The programmer may command the compiler 121 to compile the source code 130 in a compilation process that includes optimization by the first optimizer 122. Compiler 121 may thus generate a first optimized program 132. Optionally, compiler 121 (or optimizers 122 and/or 123) may generate an optimization log 142, indicating the optimization operations that were performed during the compilation and optimization, and/or indicating the code modification operations that were performed during the compilation and optimization.

Additionally or alternatively, the programmer may command the compiler 121 to compile the source code 130 in a compilation process that includes optimization by the second optimizer 123. Compiler 121 may thus generate a second optimized program 133. Optionally, compiler 121 (or optimizers 122 and/or 123) may generate an optimization log 143, indicating the optimization operations that were performed during the compilation and optimization, and/or indicating the code modification operations that were performed during the compilation and optimization Additionally or alternatively, the programmer may command the compiler 121 to compile the source code using other combinations of optimization methods. For example, compiler 121 may generate a compiled and optimized program using both the optimization of optimizer 122 and the optimization of optimizer 123; or a compiled and optimized program using multiple iterations of optimizer 122; or the like. Optionally, compiler 121 (or optimizers 122 and/or 123) may generate an optimization log, indicating the optimization operations that were performed during the compilation and optimization, and/or indicating the code modification operations that were performed during the compilation and optimization.

A code analyzer 150 operates to provide visualization of optimization operations and visual differentiation among multiple program versions. Code analyzer 150 receives or obtains as input one or more items or files, for example: the non-optimized program 131, and the "null" optimization log 141 associated therewith; and/or the first optimized program 132, and the optimization log 142 associated therewith; and/or the second optimized program 133, and the optimization log 143 associated therewith.

In some embodiments, one or more of the input items are provided to the code analyzer 150 manually or selectively by the programmer. In other embodiments, one or more the input items are provided to the code analyzer 150 automatically by compiler 121 and optimizers 122 and 123. In some embodiments, one or more of the input items are provided to the code analyzer 150 manually, and one or more of the input items are obtained by the code analyzer 150 automatically; for example, the programmer may use the code analyzer 150 to select the first optimized program 132, and the code analyzer 150 may automatically locate and obtain the optimization log 142 associated therewith.

Code analyzer 150 may determine the differences and/or code modifications between the programs that were received, or that were otherwise defined as input items for the code analyzer 150. For example, code analyzer 150 determines the differences between the non-optimized program 131 and the first optimized program 132. The determination is based on, or takes into account at least, an analysis of optimization logs 141 and 142 (or at least portions thereof), which are associated with (and reflect) the compilation and optimization processes of programs 131 and 132, respectively. The determination is not exclusively based on a textual comparison between the non-optimized program 131 and the first optimized program 132; rather, the determination is based (in whole or in part) on an analysis of the optimization operations and the code modifications operations performed by optimizer 122 as reflected in the optimization log 142.

Similarly, code analyzer 150 may determine the differences and/or code modifications between the first optimized program 132 and the second optimized program 133. The determination is based on, or takes into account at least, an analysis of optimization logs 142 and 143 (or at least portions thereof), which are associated with (and reflect) the compilation and optimization processes of programs 132 and 132, respectively. The determination is not exclusively based on a textual comparison between the first optimized program 132 and the second optimized program 133; rather, the determination is based (in whole or in part) on an analysis of the optimization operations and the code modifications operations performed by optimizers 122 and/or 123 as reflected in the optimization logs 142 and 143.

Although portions of the discussion herein relate, for demonstrative purposes, to comparisons, or determination of differences, or determination of code modifications, between two programs or between two versions of a program, some embodiments of the invention may be used for comparisons, or determination of differences, or determination of code modifications, among three or more programs or among three or more versions of a program.

Code analyzer 150 generates as output, or otherwise displays, visual representations of the determined differences between two or more of programs 131, 132 and/or 133. For example, code analyzer 150 displays a visual representation 160 showing instructions (e.g., assembly language instructions) of the non-optimized program 131, for example, a visualization 162 of the non-optimized program. In addition, code analyzer 150 displays a visual representation 170, showing instructions (e.g., assembly language instructions) of the first optimized program 132. Optionally, code analyzer 150 further displays a visual representation 180, showing instructions (e.g., assembly language instructions) of the second optimized program 133.

In some embodiments, the visual representations need not include all the instructions of the respective programs; but rather may include only selected portions or segments of the programs, for example, code portions that differ across two or more programs. For example, the visual representations may emphasize or particularly indicate code portions or instructions that were added, inserted, moved, replaced, deleted, split, transformed, or otherwise modified. The visual representations may utilize a pre-defined visualization scheme, coloring scheme, emphasis scheme, or the like.

In some embodiments, code analyzer 150 generates multiple lists reflecting code modifications performed during the compilation and optimization process, based on the analysis of the optimization log associated with that process. In other embodiments, modification lists are generated by compiler 121, optimizer 122 and/or optimizer 123, and are then utilized by the code analyzer 150.

The modification lists include, for example: a list of code insertions; a list of code deletions; a list of modified code portions; a list of all shifted or moved or relocated code portions; a list of instructions that were split; and/or lists of other transformations or code modifications, e.g., in accordance with various optimization methods (for example, selected registers of instructions that were modified in register allocation optimization).

In some embodiments, for example, an optimization process utilizing code reordering may result in a list of the relocated successive code portions (e.g., the relocated sets of instructions) that were relocated from their original location in a first version of the program to another location in a second version of the program (e.g., a version optimized using code reordering).

The code analyzer 150 analyzes and/or sorts (e.g., into groups or lists) the code modifications that were performed by the different optimization methods, for example, in order to semantically or visually map the code modifications and/or in order to visually represent differences among programs. For example, code analyzer 150 semantically maps or visually represents the differences between the first optimized program 132 and the second optimized program 133, based on analysis of the corresponding optimization logs 142 and 143. Additionally or alternatively, code analyzer 150 semantically maps or visually represents the differences between the first optimized program 132 and the original program 131 (e.g., the base reference program), based on analysis of the corresponding logs 142 and 141.

Accordingly, the visual representation 170 includes one or more code modification lists 171, reflecting the code modifications performed during the compilation and optimization process that generated the first optimized program 132. Additionally, the visual representation 170 further includes a visual representation 172 of the first optimized program 132 or of portions thereof. For example, the visual representation 172 may show, in a first color, instructions that were not modified and were not affected during the optimization process; and may further show, in a second color, instructions that were modified and/or affected during the optimization process.

Similarly, the visual representation 180 includes one or more code modification lists 181, reflecting the code modifications performed during the compilation and optimization process that generated the second optimized program 133. Additionally, the visual representation 180 further includes a visual representation 182 of the second optimized program 132 or of portions thereof. For example, the visual representation 182 may show, in a first color, instructions that were not modified and were not affected during the optimization process; and may further show, in a second color, instructions that were modified and/or affected during the optimization process.

In some embodiments, a coloring or presentation scheme may be used to differentiate among original instructions or non-modified instructions (e.g., shown in a first color or a first font); instructions that were modified or added or removed during a first optimization process (e.g., shown in a second color or a second font); and instructions that were modified or added or removed during a second optimization process (e.g., shown in a third color or a third font).

Additionally or alternatively, a coloring or presentation scheme may be used to indicate multiple code modifications that share a common type of modification. For example, instructions that were added during an optimization process may be shown in a first color or a first font (e.g., across multiple visual representations of multiple program versions); instructions that were removed during an optimization process may be shown in a second color or a second font (e.g., across multiple visual representations of multiple program versions); instructions that were split during an optimization process may be shown in a third color or third font (e.g., across multiple visual representations of multiple program versions); instructions that were relocated or moved or shifted during an optimization process may be shown in a fourth color or a fourth font (e.g., across multiple visual representations of multiple program versions); or the like.

Additionally or alternatively, a coloring or presentation scheme may be used to indicate multiple modifications that result in from a common type of optimization process. For example, code modifications that resulted from a first optimization method (e.g., code reordering) are presented in a first color or a first font (e.g., across multiple visual representations of multiple program versions); whereas code modifications that resulted from a second optimization method (e.g., register allocation) are presented in a second color or second font (e.g., across multiple visual representations of multiple program versions. This may allow semantic comparison and differentiation between code modifications resulting from different optimization methods.

Although portions of the discussion herein relate, for demonstrative purposes, to visual representations utilizing colors or a coloring scheme, other types of visual representations may be used, additionally or alternatively. For example, some embodiments may use other types of highlighting or emphasizing, enlarged font size, reduced font size, italic font, slanted fonts, different font types for differentiation, bold or non-bold fonts for differentiation, underline, flashing effects, font color, background color, shading, framing, grayscale levels, asterisks, footnotes, "balloons" or "bubbles" that float or appear in proximity to instructions, information elements that appear when a pointing device (e.g., a mouse) hovers over an instruction, audible descriptions of code modifications (e.g., using a text-to-speech component), or the like.

In some embodiments, visual representations 160, 170 and/or 180 may be presented in parallel, in proximity to each other, side by side, one on top of the other, in a cascade format, in a tiled format, using windows, using overlapping or non-overlapping regions, using a tabbed interface that allows switching among multiple visual representations using tabs or other indexing mechanism, or the like.

Optionally, code analyzer 150 further includes an interface 180 allowing the programmer to examine or otherwise utilize the visual representations 160, 170 and/or 180. The interface 180 includes, for example, a "show next" button 191 which triggers a command to forward or scroll a program version to show a subsequent instruction that was modified; a "show previous" button 192 which triggers a command to rewind or scroll-back a program version to show a previous instruction that was modified; and other suitable buttons or command-triggering mechanisms.

For example, interface 180 optionally includes: a button to trigger a command to temporarily hide (or show) a particular type of modifications; a button to produce a printer-friendly version of the visual representations (e.g., optionally using font modification effects or black-and-white effects or grayscale effects, instead of coloring effects); a button to allow closing or resizing or minimizing or maximizing of a visual representation; a button to trigger a command to save or export one or more visual representations (e.g., as a graphical file, as a word processing file, as a spreadsheet file, or the like); buttons or interface components to allow scrolling or moving or browsing through a visual representation; buttons or interface components to select visual representations for removal from the display; buttons or interface components to allow the user to select an optimization log file and/or a program version, from which a visual representation is to be generated by the code analyzer 150; or the like.

Optionally, interface 180 may include a button or mechanism 194 allowing the programmer to re-compile and/or re-optimize the source code 130 (or a previously-optimized version thereof), optionally by selecting one or more optimization options using an optimization options selection interface 193. The new compilation and optimization process is then applied to one or more of the program versions, for example, selected by the programmer from the multiple visual representations 160, 170 or 180. The resulting compiled and optimized program may further be used by code analyzer 150 in order to add another visual representation thereof, showing the list of code modifications due to the optimization, as well as a visualization of modified code portions, based on analysis of the optimization log associated with the new compilation and optimization process.

In some embodiments, for example, the programmer may utilize the interface 180 to select a visual representation from the multiple visual representation 160, 170 and 180 presented by code analyzer 150. The optimization options selection interface 193 presents to the programmer a list of the available optimization methods, e.g., an interactive list in which the programmer is able to select and/or de-select various optimization methods. Upon selection of the requested optimization methods, the programmer may utilize the button 194 to command the compiler 120 to compile and optimize the source code 130 (or another version of the program, optionally a previously-optimized version) in accordance with the selected optimization options.

Optionally, each of visual representations 160, 170 and 180 is accompanied by a title or file-name or other tag, indicating the program version to which it relates or from which it was derived. This may allow the programmer to rapidly identify and associate between a visual representation and the program version to which it relates.

Optionally, code analyzer 150 may track and visually present code modifications in conjunction with an iterative process, in which the programmer applies a first optimization method, examines the resulting optimized program, further applies a second optimization method on the previously-optimized program, examines the resulting optimized program, and so on. Code analyzer 150 provides the programmer a visual representation of the code modifications performed by each optimization stage; and further provides the programmer an interface to command the compiler 120 which optimization methods to invoke in a subsequent stage.

The iterative fine-tuning and optimization process may terminate, for example, once the programmer determines that the optimized program meets one or more requirements. The programmer may indicate to the code analyzer 150 that a particular optimized program is to be regarded as the final optimized program. Code analyzer may then generate as output a list of all code modifications of the final optimized program, in comparison with the non-optimized program 131. The visual presentation may utilize a coloring scheme or other visualization scheme, for example, in order to facilitate the identification of code modifications; in order to facilitate the differentiation among types or groups of code modifications (e.g., code insertion, code deletion, code relocation, or the like); in order to facilitate the differentiation among code modifications that resulted from different optimization methods (e.g., code reordering, register allocation, or the like); in order to facilitate differentiation among code modifications that resulted from different iterations of an optimization method (e.g., a first iteration of code reordering, a second iteration of code reordering, or the like); or in order to emphasize other unique properties or common properties of one or more code modifications.

In some embodiments, one or more types of optimization methods are provided by compiler 121 and/or optimizers 122 and 123. A first type of optimization methods includes layout optimization, for example, code reordering, data reordering, or the like. With respect to these optimization methods, a map or list of relocated code portions or relocated data units are generated and utilized, e.g., a pre-optimization map and/or a post-optimization map. The maps may be generated by compiler 121, by optimizer 122, or by optimizer 123 (e.g., during the compilation and/or optimization process), or by the code analyzer 150 (e.g., post-optimization and based on the logs 141, 142 and/or 143). The code analyzer 150 utilizes the maps to generate a visual representation of the program modifications, which refers to each original instruction or data unit and to its relocated version.

A second type of optimization methods includes code expansion optimizations, for example, function in-lining, function cloning, loop unrolling, tail duplication, or the like. Pre-optimization maps or lists, and post-optimization maps or lists, are generated (e.g., of a pre-optimization version of the in-lined functions and a post-optimization version of the in-lined function); the maps are compared or analyzed by code analyzer 150, to generate a visual representation of the code modifications, optionally highlighting or otherwise emphasizing modifications between a pre-optimization version and a post-optimization version. Such modifications include, for example, removal of call and return instructions, saving and restoring of return address, or the like. Similarly, for loop unrolling, each unrolled iteration is determined by the code analyzer 150 and highlighted or visually emphasized in a different presentation method (e.g., different color, different font type, different font size, or the like), thereby specifying the unrolling factor. Additionally or alternatively, multiple modifications to the loop are further highlighted or visually emphasized; for example, modification to an induction variable, and modification to conditional statements that precede the unrolled loop and branch to the remainder part of the unrolled loop, are highlighted or visually emphasized.

A third type of optimization methods includes general optimizations, for example, invariant code motion, instruction scheduling, register allocation, "dead code" elimination, or the like. For such optimizations, each code modification is tracked or identified. Code analyzer 150 generates a visual representation that highlights or otherwise emphasizes, for example, an initial (e.g., pre-optimization) code portion, and subsequent (e.g., post-optimization) code portions and sub-changes resulting in from the optimization.

In some embodiments, code analyzer 150 determines and visually represents: "core" or "initial" or "primary" code modification, e.g., an insertion of an instruction, a removal of an instruction, a relocation of an instruction, or the like; and/or "derived" or "secondary" code modifications, which include modifications that derive from "primary" code modifications, e.g., modification of offsets in affected instructions, or modified references to a memory address due to code re-ordering or due to relocation of an instruction. In some embodiments, primary code modifications are presented using a first color or font property, whereas secondary code modifications are presented using a second color or font property. In other embodiments, a first set that includes a primary code modification and the secondary modifications associated therewith, is presented using a first color or font property; whereas a second set that includes another primary code modification and the secondary modifications associated therewith, is presented using a second color or font property.

In some embodiments, code analyzer 150 differentiates among multiple program versions, and determines code modifications for visualization, based on optimization logs 141, 142 and/or 143. Additionally or alternatively, code analyzer 150 provides a different highlighting scheme for each optimization method. Accordingly, a program version that was optimized using multiple optimization methods, include multiple types of highlighting (e.g., multiple colors, multiple font types, multiple font sizes, multiple presentation effects, or the like) corresponding to the multiple optimization methods; and each type of highlighting indicates code modifications that were performed by each optimization method, respectively.

In some embodiments, code analyzer 150 determines code modifications among program versions prior to execution of any of the program versions; prior to execution of at least one of the program versions; without a need to execute any (or one or more) of the program versions; without comparing output or results generated by multiple program versions when executed; without comparing output or results generated by multiple program versions in response to a common input; and by performing a static analysis which does not utilize post-execution output of multiple program versions.

In some embodiments, code analyzer 150 generates visual representations of code modifications, that are not in the form of a log file or a difference ("diff") file between program versions; that are not in the form of a list of lines where each line describing a single code modification; but rather, that are in a visually convenient presentation format that allows rapid identification by the programmer of code modifications among multiple program versions, optionally using a coloring scheme or other highlighting or emphasizing scheme.

In some embodiments, system 100 does not perform an automatic re-compilation or an automatic re-optimization of the source code 130 using various optimization methods, or using multiple iterations of an optimization method (for example, in order to attempt to automatically determine a most-optimized program version. In contrast, system 100 allows a programmer to selectively apply or re-apply one or more optimization methods, or to selectively apply or re-apply multiple iterations of an optimization method, in order to determine by the programmer a most-optimized program version that meets the requirements of the programmer.

In some embodiments, some of the functions described herein with reference to the code analyzer 150, may be performed by other components of system 100, for example, by compiler 121, by optimizer 122, or by optimizer 123. For example, generation of code modifications lists may be performed by compiler 121, by optimizer 122, or by optimizer 123, after the compilation and optimization is completed (e.g., by analyzing and re-arranging the logs 141-143) or during the compilation and optimization.

In some embodiments, optionally, the code analyzer 150 may utilize an Application Programming Interface (API) or other modules, front-ends or interfaces associated with the compiler 121 and/or associated with the optimizers 122-123, in order to obtain information about optimization operations that were performed and/or information about code modification resulting from such optimization operations. In some embodiments, code analyzer 150 may utilize such information in addition to or instead of the information from logs 141-143.

In some embodiments, the visual representations generated by the code analyzer 150 may show program versions in assembly language, and may show and highlight assembly language code modifications.

Figure 2:
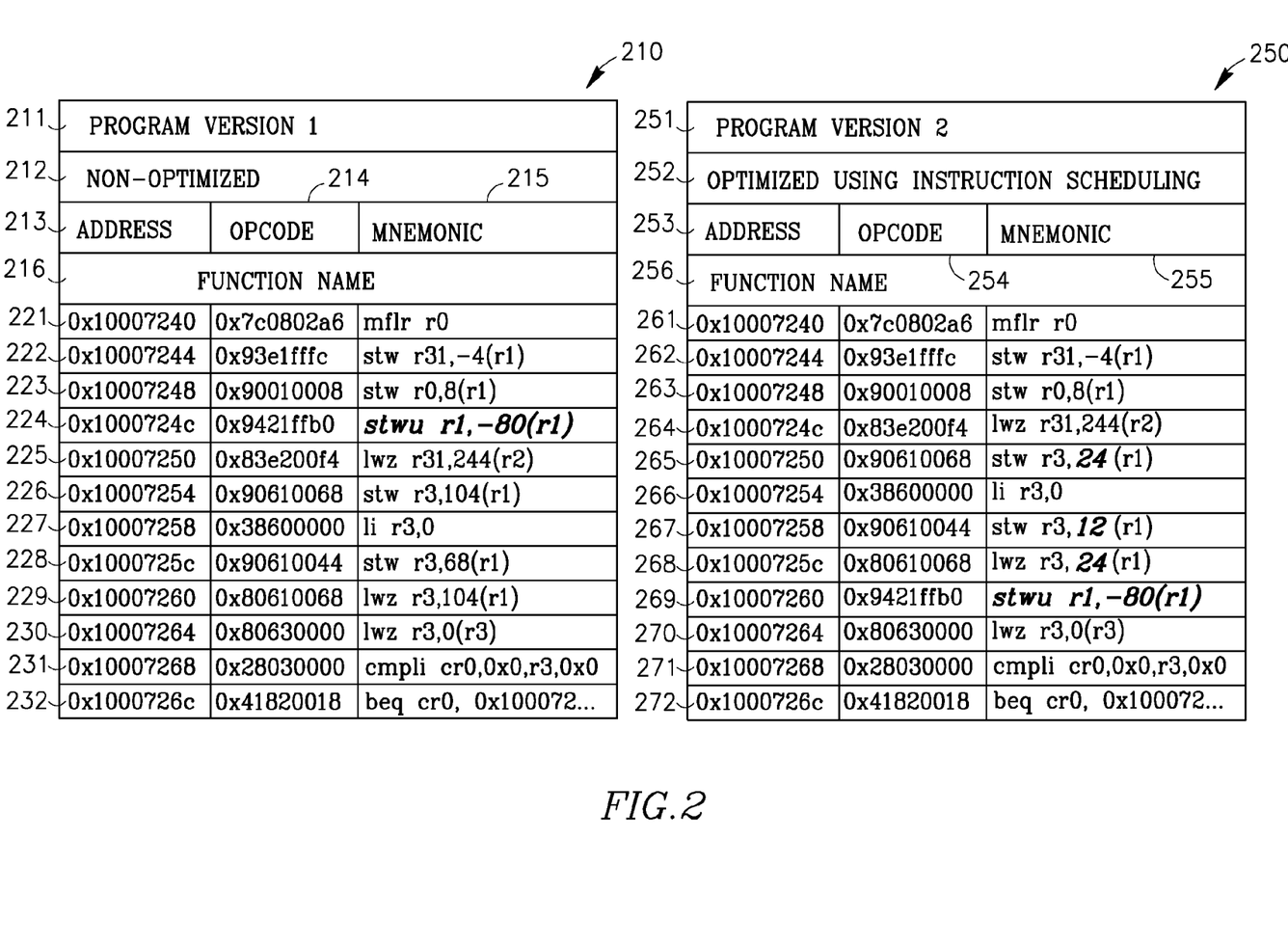
FIG. 2 is a schematic illustration of visual representations of program versions in accordance with a demonstrative embodiment of the invention.

FIG. 2 schematically illustrates visual representations 210 and 250 of program versions in accordance with some demonstrative embodiments of the invention. Visual representations 210 and 250 may be generated and/or presented, for example, by code analyzer 150 of FIG. 1.

Visual representation 210 includes a title indication 211, indicating that visual representation 210 relates to a code portion of a first program version; whereas visual representation 250 includes a title indication 251, indicating that visual representation 250 relates to a code portion of a second program version. In some embodiments, both of the visual representations 210 and 250 relate to code portions that reside in the same memory space, or in two memory portions that overlap at least partially. In other embodiments, visual representations 210 and 250 relate to code portions that reside in different (e.g., non-overlapping) memory portions, based on a determination by the code analyzer that these code portions are to be visually represented (e.g., due to optimization methods that resulted in code relocation).

Visual representation 210 includes a tag indication 212, describing one or more properties of the first program version. For example, tag indication 212 indicates that the first program version is a non-optimized program version. Similarly, visual representation 250 includes a tag indication 252, describing one or more properties of the second program version. For example, tag indication 252 indicates that the second program version is an optimized program version, and/or particularly that the second program version was optimized using a particular optimization method (e.g., using instruction scheduling).

Visual representation 210 further includes memory addresses (column 213), operation codes (OpCodes) that reside in these memory addresses (column 214), and mnemonics of the OpCodes (column 215). Optionally, a code block identifier 216 is included, e.g., to indicate a beginning or an ending of a function, a subroutine, a loop, a data block, or the like.

Similarly, visual representation 250 further includes memory addresses (column 253), operation codes (OpCodes) that reside in these memory addresses (column 254), and mnemonics of the OpCodes (column 255). Optionally, a code block identifier 256 is included, e.g., to indicate a beginning or an ending of a function, a subroutine, a loop, a data block, or the like.

Visual representation 210 further includes multiple rows (e.g., rows 221-232), each row including a memory address, the corresponding OpCode, and the corresponding mnemonic. Similarly, visual representation 250 further includes multiple rows (e.g., rows 261-272), each row including a memory address, the corresponding OpCode, and the corresponding mnemonic.

In some embodiments, substantially all the memory addresses and all the OpCodes are shown using common font properties (e.g., the same font type, the same font size, the same font color, or the like). Mnemonics, or mnemonic portions, that are non-modified between the first and second program versions, are similarly shown using the common font properties. In contrast, mnemonics, or mnemonic portions, that are modified between the first and second program versions, are shown using a second, different, font property (e.g., a different font type, a different font size, a different font color, or the like).

Visual representations 210 and 250 show that the instruction "stwu r1, -80(r1)" resides at memory address "0x10000724c" (line 224) in the first program version (e.g., the non-optimized program); and that this instruction ("stwu r1, -80(r1)") was relocated or scheduled forward to memory address "0x100007260" (line 269) in the second program version (e.g., a program version optimized using instruction scheduling). In some embodiments, the instruction "stwu r1, -80(r1)" is thus highlighted or otherwise visually emphasized (e.g., using a unique font color, a unique font type, a unique font size, or the like), in both of the visual representation 210 and 250. For demonstrative purposes, and since FIG. 2 is illustrated in black-and-white, the relocated instruction "stwu r1, -80(r1)" is shown in italic and bold font in the visual representations 210 and 250.

Due to the primary code modification of relocating the instruction "stwu r1, -80(r1)", one or more secondary code modifications were performed due to the relocation or deriving from the relocation, e.g., offset modifications in affected instructions. For example, three of the secondary code modifications are highlighted or otherwise visually emphasized (e.g., using a unique font color, a unique font type, a unique font size, or the like) in visual representation 250 (lines 265, 267 and 268), e.g., by highlighting or otherwise visually emphasizing a portion of the mnemonic that was affected and modified. For demonstrative purposes, and since FIG. 2 is illustrated in black-and-white, the modified portions in lines 265, 267 and 268 are shown in italic and bold font in the visual representation 250.

In some embodiments, non-modified code is presented using a first color or font property; whereas modified code (including primary code modifications and secondary code modifications) is presented using a second color or font property. In other embodiments, non-modified code is presented using a first color or font property; modified code including primary code modifications is presented using a second color or font property; and modified code including secondary code modifications is presented using a third color or font property.

In some embodiments, a coloring scheme is used in visual representations 210 and 250 to differentiate among code modifications that result from different methods of optimization, or from different iterations of an optimization method. For example, in some embodiments, code modifications resulting from a first optimization method are presented in visual representations 210 and 250 using a first color or font property; whereas code modifications resulting from a second, different, optimization method are presented in visual representations 210 and 250 using a second color or font property. Additionally or alternatively, different colors or visualization effects may be used to differentiate among multiple iterations of an optimization method. Other visualization schemes may be used.

Figure 3:
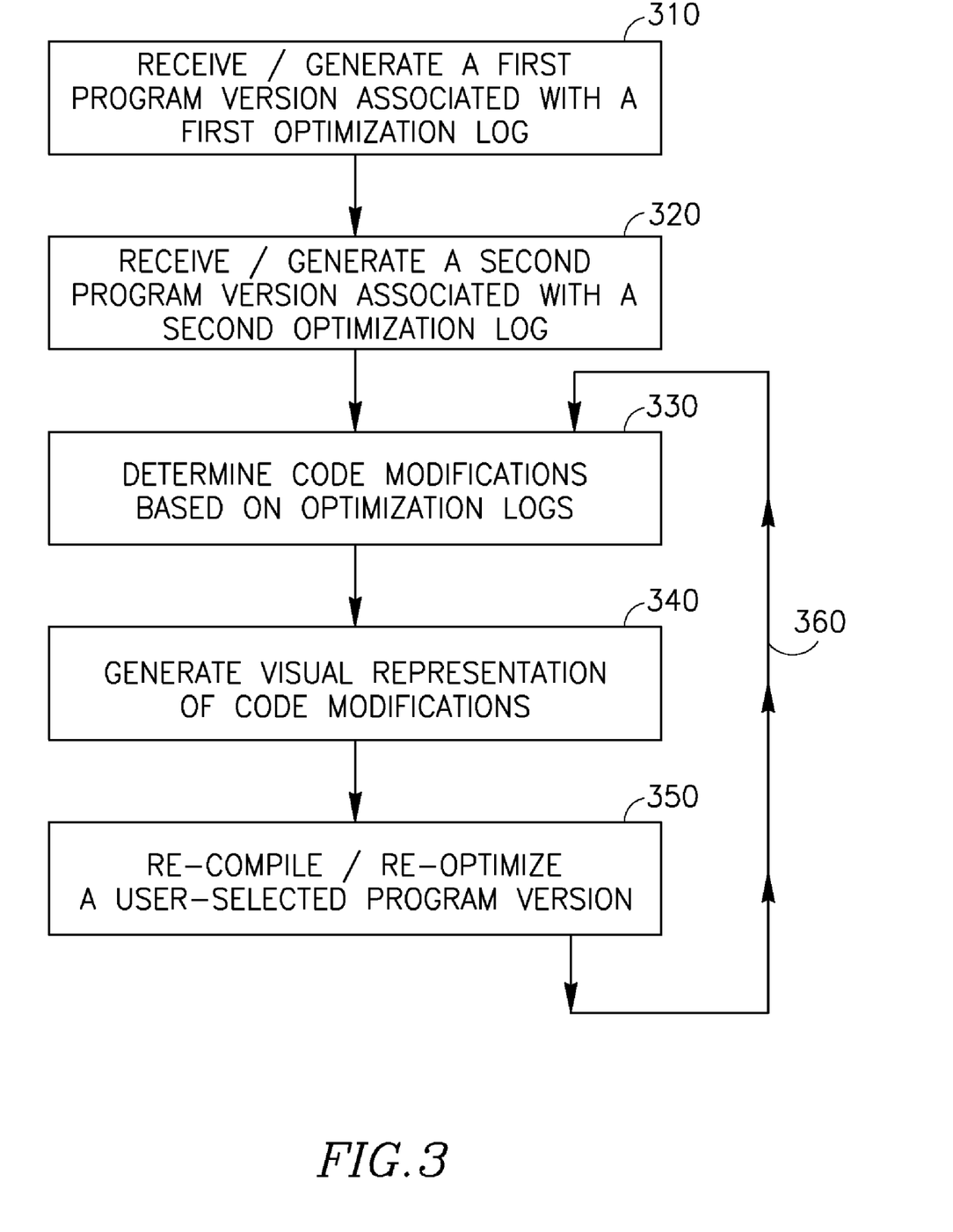
FIG. 3 is a schematic flow-chart of a method of computer program optimization in accordance with a demonstrative embodiment of the invention.

FIG. 3 is a schematic flow-chart of a method of computer program optimization in accordance with some demonstrative embodiments of the invention. Operations of the method may be used, for example, by system 100 of FIG. 1, by code analyzer 150 of FIG. 1, and/or by other suitable units, devices and/or systems.

In some embodiments, the method may include, for example, receiving or generating a first program version associated with a first optimization log (block 310).

In some embodiments, the method may include, for example, receiving or generating a second program version associated with a second optimization log (block 320).

Although FIG. 3 shows, for demonstrative purposes, the operations of block 310 followed by the operations of block 320, some embodiments of the invention may utilize other orders of execution. For example, in some embodiments, the operations of block 310 may be performed in parallel, or substantially simultaneously, with the operations of block 320.

In some embodiments, the method may include, for example, determining code modifications between the first and second program versions, based on an analysis of optimization operations as reflected in at least one of the first and second optimization logs (block 330).

In some embodiments, the method may include, for example, generating a visual representation of the code modifications (block 340).

In some embodiments, the method may include, for example, based on user input (e.g., entered through a user interface), re-compiling or re-optimizing a user-selected program version utilizing user-selected optimization method(s) (block 350).

Optionally, one or more of the operations may be repeated, for example, as indicated by an arrow 360. For example, the optimization log of a newly compiled and optimized program version may be analyzed; code modifications of the newly compiled and optimized program version may be determined; and the newly compiled and optimized program version that results in from the operation of block 350 may be added to the visual representations.

Other suitable operations or sets of operations may be used in accordance with embodiments of the invention.

Functions, operations, components and/or features described herein with reference to one or more embodiments, may be combined with, or may be utilized in combination with, one or more other functions, operations, components and/or features described herein with reference to one or more other embodiments, or vice versa.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method executable by one or more processors for analyzing program code, the method comprising:
   determining one or more code differences between first and second versions of the program code, based on an analysis of at least one optimization log generated as a result of compiling and optimizing the first version of the program code,
   wherein code differences between the first version and the second version of the program code are results of modification made to the first version of the program code during the compiling and the optimizing performed on the first version of the program code that resulted in generating the second version of the program code,
   wherein the optimization log indicates optimization operations or code modifications performed during compilation or optimization of the first version of the program code,
   generating a visual representation of differences between the first and the second versions of the program code, wherein the visual representation includes references to at least one of a memory address, an operation code that resides in said memory address and a corresponding mnemonic, wherein at least a portion of the mnemonic that is determined as modified between the first and second program versions is ubiquitously marked by changing at least one visually recognizable textual attribute of the mnemonic, wherein the one or more code differences comprise one or more code modifications selected from a group consisting of code insertion, code deletion, code relocation, code replacement, and code split.

2. The method of claim 1, comprising:
receiving at least one optimization log;
generating one or more lists of code modifications corresponding to one or more optimization methods; and
determining said code differences based on said one or more lists.

3. The method of claim 1, comprising:
generating a visual representation having a first portion corresponding to the first version and a second portion corresponding to the second version; and
visually emphasizing in the first and second portions the determined code differences.

4. The method of claim 1, comprising:
presenting unmodified code using a first visual a presentation property, and modified code using a second visual presentation property.

5. The method of claim 1, comprising:
presenting code modified by a first optimization method using a first visual a presentation property, and code modified by a second optimization method using a second visual presentation property.

6. The method of claim 1, comprising:
presenting code modifications using one or more visual presentation properties selected from a group consisting of: font color, font type, font size, bold property, underline property, italic property, background color, frame, shade, grayscale effect, flashing effect, and balloon effect.

7. A system having memory and one or more processors to analyze program code, the system comprising:
   a compiler executed on one or more processors to generate first and second versions of the program code; and
   a code analyzer to determine one or more code differences between first and second versions of the program code, based on an analysis of at least one optimization log generated as a result of compiling and optimizing the first version of the program code,
   wherein code differences between the first version and the second version of the program code are results of modification made to the first version of the program code during the compiling and the optimizing performed on the first version of the program code that resulted in generating the second version of the program code, and wherein said optimization log indicates optimization operations or code modifications performed during compilation or optimization of the first version of the program code, the code analyzer generating a visual representation of differences between the first and the second versions of the program code, wherein the visual representation includes references to a memory address, an operation code that resides in said memory address and a corresponding mnemonic, wherein at least a portion of the mnemonic that is determined as modified between the first and second program versions is ubiquitously marked by changing at least one visually recognizable textual attribute of the mnemonic, wherein the one or more code differences comprise one or more code modifications selected from a group consisting of code insertion, code deletion, code relocation, code replacement, and code split.

8. The system of claim 7, wherein the code analyzer is to receive at least one optimization log, to generate one or more lists of code modifications corresponding to one or more optimization methods, and to determine said code differences based on said one or more lists.

9. The system of claim 7, wherein the code analyzer is to present code modifications using one or more visual presentation properties comprising at least on of font color, font type, font size, bold property, underline property, italic property, background color, frame, shade, grayscale effect, flashing effect, or balloon effect.

10. An apparatus comprising:
one or more processors communicatively coupled to data storage media to analyze program code;
a code analyzer to determine one or more code differences between first and second versions of the program code, based on an analysis of at least one optimization log generated as a result of compiling and optimizing the first version of the program code,
wherein code differences between the first version and second version of the program code are results of modification made to the first version of the program code during the compiling and the optimizing performed on the first version of the program code that resulted in generating the second version of the program code, and
wherein the optimization log indicates optimization operations or code modifications performed during compilation or optimization of the first version of the program code,
the code analyzer generating a visual representation of differences between the first and the second versions of the program code, wherein the visual representation includes references to a memory address, an operation code that resides in said memory address and a corresponding mnemonic, wherein at least a portion of the mnemonic that is determined as modified between the first and second program versions is ubiquitously marked by changing at least one visually recognizable textual attribute of the mnemonic,
wherein the one or more code differences comprise one or more code modifications selected from a group consisting of code insertion, code deletion, code relocation, code replacement, and code split.

11. The apparatus of claim 10, wherein the code analyzer is to receive at least one optimization log, to generate one or more lists of code modifications corresponding to one or more optimization methods, and to determine said code differences based on said one or more lists.

12. The apparatus of claim 10, wherein the code analyzer is to generate a visual representation having a first portion corresponding to the first version and a second portion corresponding to the second version, and to visually emphasize in the first and second portions the determined code differences.

13. The apparatus of claim 10, wherein the code analyzer is to present unmodified code using a first visual a presentation property, and to present modified code using a second visual presentation property.

14. The apparatus of claim 10, wherein the code analyzer is to present code modified by a first optimization method using a first visual a presentation property, and to present code modified by a second optimization method using a second visual presentation property.

15. The apparatus of claim 10, wherein the first and second versions of the program code comprise program versions selected from a group consisting of:
a non-optimized program,
a program optimized using a first optimization method,
a program optimized using a second optimization method, and
a program optimized using multiple optimization methods.

16. The apparatus of claim 10, wherein the code analyzer is to present code modifications using one or more visual presentation properties selected from a group consisting of:
font color, font type, font size, bold property, underline property, italic property, background color, frame, shade, grayscale effect, flashing effect, and balloon effect.

17. The apparatus of claim 10, wherein the code analyzer comprises:
a user interface to receive a user selection of one of the plurality of versions, to receive a user selection of one or more optimization methods to be applied to the selected version, and to receive a user command to apply the selected one or more optimization methods to the selected version.

18. The apparatus of claim 10, wherein the code analyzer is to determine assembly language code modifications and to present the determined assembly language code modifications.

* * * * *